United States Patent [19]

Yamada et al.

[11] Patent Number: 5,053,901
[45] Date of Patent: Oct. 1, 1991

[54] THREADING DEVICE FOR TAPE RECORDER INCLUDING A TENSION ARM ABUTTED AGAINST A SLIDE BLOCK IN AN INITIAL POSITION

[75] Inventors: Fumiya Yamada; Akira Shimizu; Atsushi Kurosawa, all of Saitama, Japan

[73] Assignee: Pioneer Electronic Corporation, Tokyo, Japan

[21] Appl. No.: 330,667

[22] Filed: Mar. 30, 1989

[30] Foreign Application Priority Data

Jun. 23, 1988 [JP] Japan .................................. 63-153490

[51] Int. Cl.⁵ ............................................. G11B 5/027
[52] U.S. Cl. ......................................... 360/85; 360/95
[58] Field of Search ................. 360/90, 93, 95, 96.1, 360/96.5, 71, 74.1, 74.5, 74.6, 85, 74.3

[56] References Cited

U.S. PATENT DOCUMENTS

| | | | |
|---|---|---|---|
| 4,616,274 | 10/1986 | Nagaoka | 360/95 X |
| 4,654,730 | 3/1987 | Fleck et al. | 360/96.5 |
| 4,872,075 | 10/1989 | Yamaguchi et al. | 360/95 X |
| 4,908,723 | 3/1990 | Ohyama et al. | 360/95 X |
| 4,912,578 | 3/1990 | Katohno et al. | 360/95 X |

FOREIGN PATENT DOCUMENTS

| | | |
|---|---|---|
| 0201699 | 11/1986 | European Pat. Off. . |
| 2952537 | 7/1980 | Fed. Rep. of Germany . |
| 3010775 | 10/1980 | Fed. Rep. of Germany . |
| 3238510 | 5/1983 | Fed. Rep. of Germany . |
| 3644284 | 6/1987 | Fed. Rep. of Germany . |
| 3701159 | 7/1987 | Fed. Rep. of Germany . |
| 3718970 | 12/1987 | Fed. Rep. of Germany . |
| 62-145560 | 6/1987 | Japan . |
| 2185616 | 7/1987 | United Kingdom . |

*Primary Examiner*—Andrew L. Sniezek
*Attorney, Agent, or Firm*—Sughrue, Mion, Zinn, Macpeak & Seas

[57] ABSTRACT

A threading device for a tape recorder installed in vehicle includes a pair of slide blocks which are provided with guide rollers for drawing a tape from a tape cassette and winding the tape on a cylinder head. One of the slide blocks is abutted against a guide groove, and a tension arm is abutted against the other slide block to thereby prevent the rattling of the slide blocks due to vibration produced during operation of the vehicle.

4 Claims, 12 Drawing Sheets

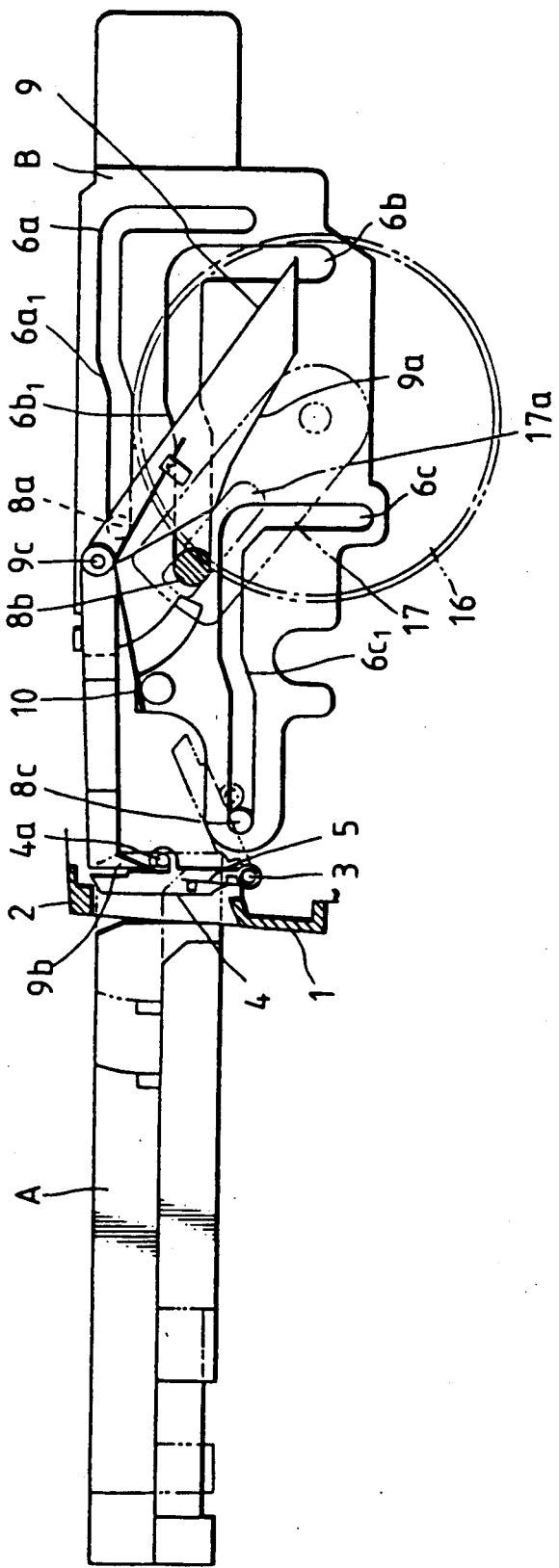
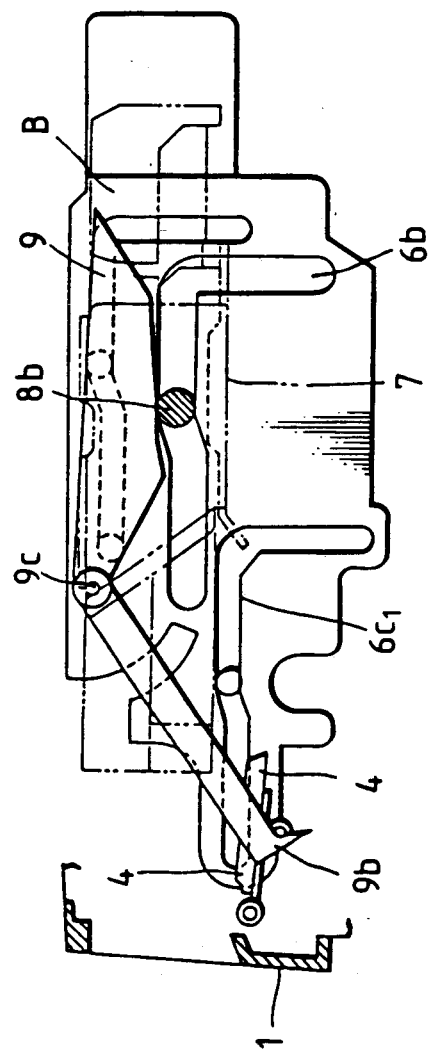

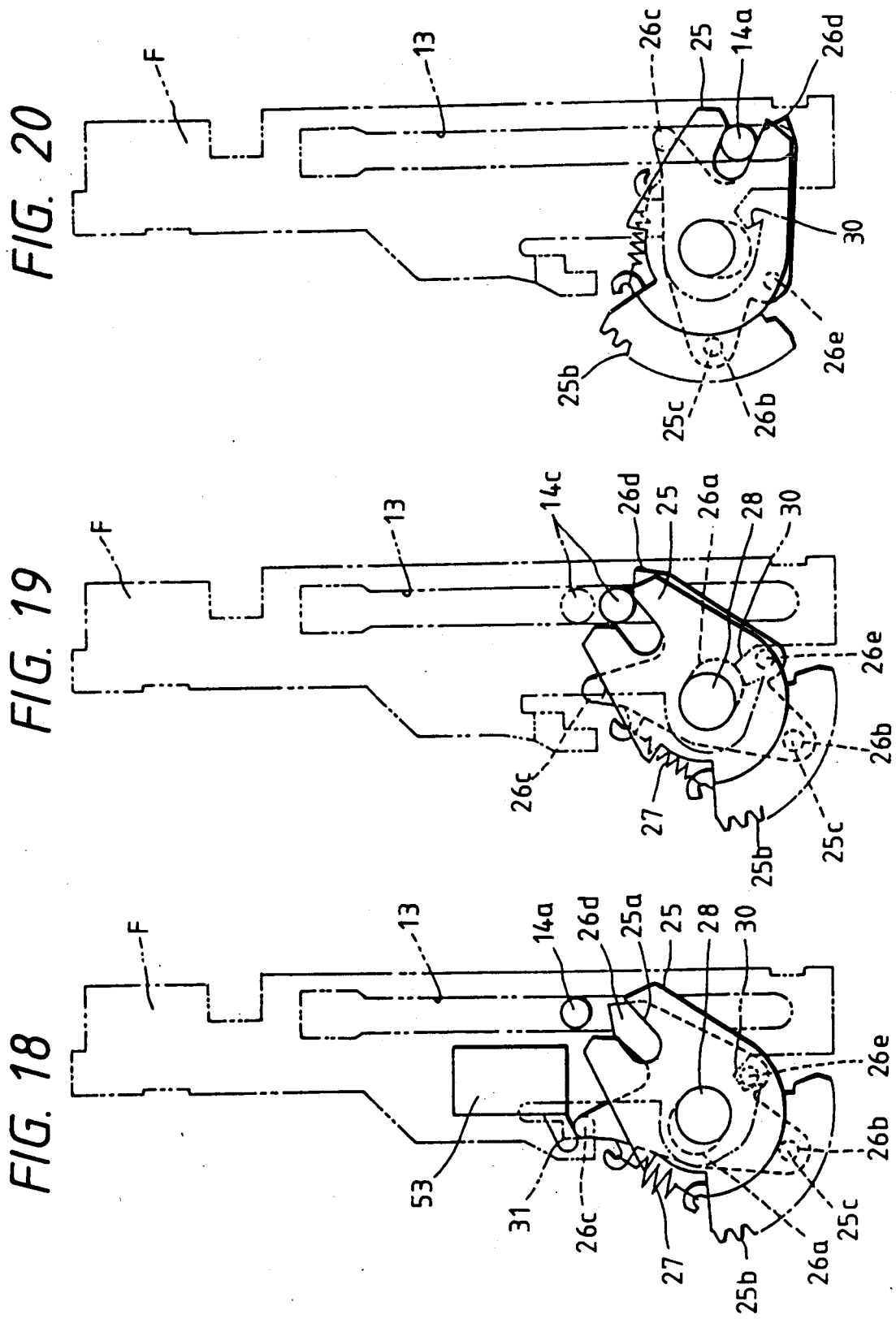

THREADING DEVICE FOR TAPE RECORDER INCLUDING A TENSION ARM ABUTTED AGAINST A SLIDE BLOCK IN AN INITIAL POSITION

BACKGROUND OF THE INVENTION

The present invention relates to a threading device for a tape recorder, such as a video tape recorder, an 8-mm video tape recorder or an audio tape recorder, which device draws a tape from a tape cassette set in a threading position and winds the tape on a cylinder.

In conventional tape recorders of this type, slide blocks, which are provided with guide rollers for drawing a tape from a tape cassette and winding the tape on a cylinder head, are driven by gears with an arm or the like.

However, before effecting a threading operation, it is possible that the slide blocks are slightly moved or displaced due to backlash of the gear, play of the arm, etc.

When such a tape recorder is installed in an automobile or the like, there has been a problem in that the slide blocks are subjected to vibration produced during operation of the automobile. The vibration in turn causes the slide blocks to rattle and produce noises due to their contact with guide grooves.

Further, a rotatable member, for driving the gears which in turn move the slide blocks or a pivotal retainer member movable with the rotatable member, may be moved due to the above-noted vibration to thereby displace the slide blocks. As a result, when the tape cassette is set in the threading position the guide rollers sometimes cannot be positioned on the backside of the tape.

SUMMARY OF THE INVENTION

An object of this invention is to overcome the above-noted problems of the conventional tape recorder threading devices. More specifically, it is an object of this invention to prevent the rattling of the slide blocks due to the vibration of an automobile when the tape recorder is installed in the automobile, and to solve the various problems arising at the time of setting the tape cassette at the threading position by moving the tape cassette to the threading position by the slider blocks.

It is another object to provide a device for preventing the erroneous insertion of a cassette for a tape recorder.

The present invention provides a threading device for a tape recorder which achieves the above object. In particular, one of a pair of slide blocks is abutted against a guide groove, and a tension arm is abutted against the other slide block, thereby preventing the rattling of the slide blocks.

BRIEF DESCRIPTION OF THE DRAWINGS

FIG. 5 is a side-elevational view showing a tape cassette-introducing portion before the tape cassette is inserted;

FIG. 6 is a side-elevational view similar to FIG. 5 but showing the condition in which a loading operation is taking place;

FIG. 18 is a plan view showing a threader gear in its inoperative condition;

FIG. 19 is a plan view similar to FIG. 18 but showing the condition in which the threading operation is started;

FIG. 20 is a plan view similar to FIG. 19 but showing the condition in which the operation is completed;

DETAILED DESCRIPTION OF THE PREFERRED EMBODIMENT

Figure 1:
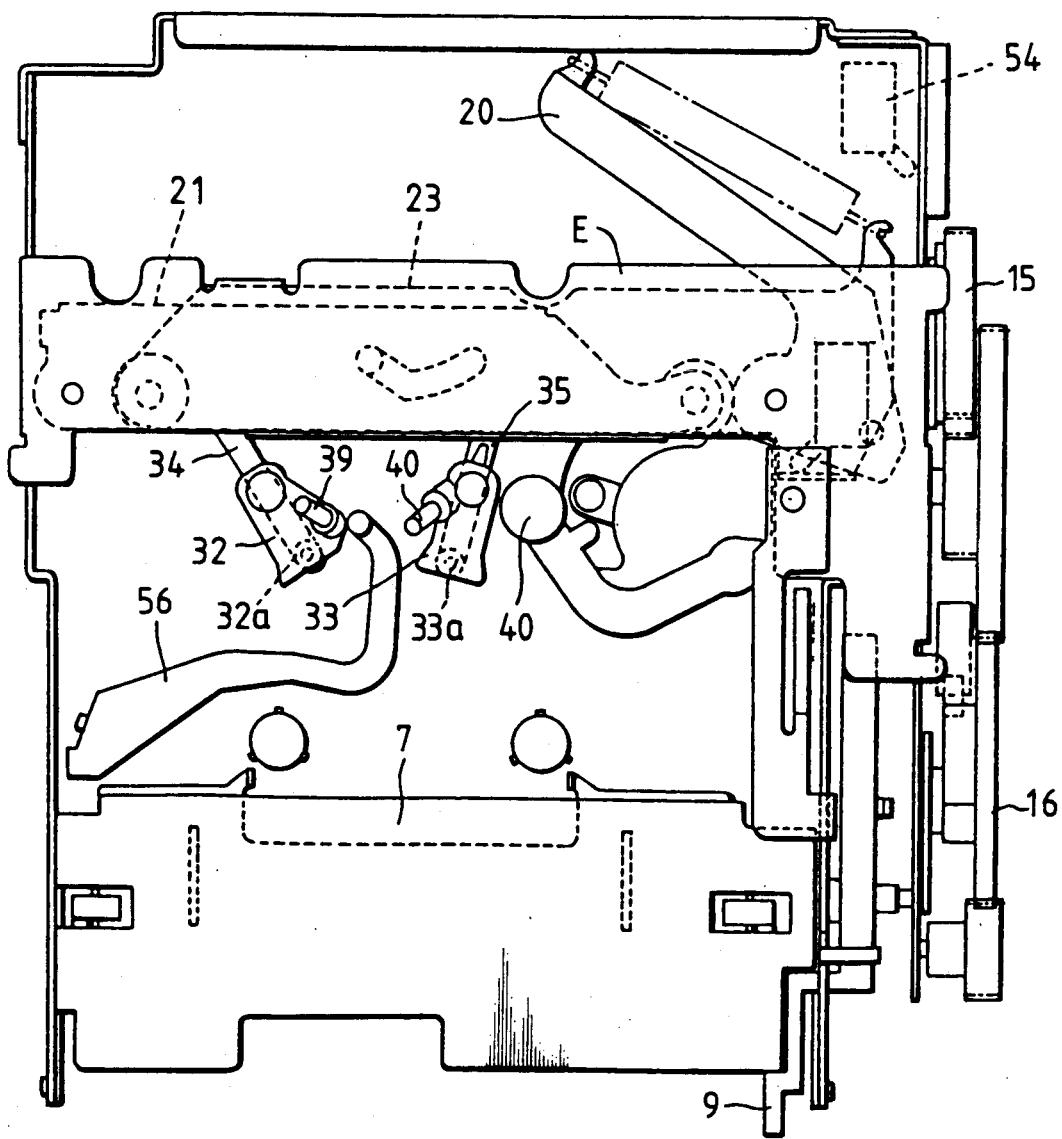
FIG. 1 is a plan view of a preferred embodiment of the present invention.

A preferred embodiment of the invention will now be described with a digital audio tape recorder shown in the drawings.

Referring to FIGS. 4 to 7, a front panel 1 has an insertion opening 2 for inserting a tape cassette A. A door 4 is hingedly mounted by a hinge 3 disposed on the backside of, and below the insertion opening 2. A spring 5 is mounted on the door 4 to urge or bias the same to close the insertion opening 2.

A chassis B is fixedly secured to the backside of the front panel 1. Three guide grooves 6a, 6b and 6c of an inverted L-shape are formed through the chassis B in parallel relation to one another. Horizontal portions of these guide grooves are downwardly stepped as at 6al, 6bl and 6cl to provide lower horizontal sections disposed close to the front panel 1. A cassette box 7 (FIG. 1) for receiving the tape cassette A inserted through the insertion opening 2 has pins 8a, 8b and 8c thereon which are slidably received in the guide grooves 6a, 6b and 6c, respectively. Therefore, the cassette box 7 is movable in accordance with the shapes of the guide grooves 6a, 6b and 6c.

Therefore, when the cassette box 7 is moved along the horizontal portions of the guide grooves 6a, 6b and 6c toward the front panel 1, the cassette box 7 moves downwardly at the stepped portions 6al, 6bl and 6cl. When the cassette box 7 reaches  front ends of these guide grooves, it is disposed adjacent to the backside of the insertion opening 2. An arm 9 is pivotally connected to the outer surface of the chassis B by a pin 9c, the arm 9 having a cam surface 9a for contact with the pin 8b and also having a hook portion 9b for pushing a pin 4a of the door 4. A spring 10 for urging the cam surface 9a downwardly is mounted on the outer surface of the chassis B.

Referring to FIG. 2 and FIGS. 12 to 14, a motor 11 is provided for loading and threading purposes, and the rotation of the motor is transmitted to a gear 12 through a belt and a gear mechanism.

The gear 12 is in mesh with a rack 14 having a pin 14a slidably received in a guide groove 13 through the chassis B so that the rack 14 is linearly movable.

The rack 14 has an engaging groove 14b, urging walls 14c and 14d disposed on opposite sides of the engaging groove 14b and rotation-preventing surfaces 14e and 14f extending from the engaging groove 14b.

Referring to FIG. 1 and FIGS. 15 to 17, a gear 15 is rotatably mounted on the chassis B. The gear 15 has a long pin 15a which is engageable in the engaging groove 14b for being angularly moved. The long pin 15a cooperates with the rotation-preventing surface 14e to prevent the gear 15 from rotating in a direction of an arrow C (FIG. 15), and also cooperates with the rotation-preventing surface 14f to prevent the gear 15 from rotating in a direction opposite to the direction of the arrow C.

The gear 15 has a short pin 15b which is adapted to be urged by the urging wall 14d, disposed on one side of the engaging groove 14b, so as to rotate the gear 15 in the direction of the arrow C. The gear 15 also has a short pin 15c which is adapted to be urged by the urging wall 14c, disposed on the other side of the engaging groove 14b, so as to rotate the gear 15 in the direction opposite to the direction of the arrow C.

As shown in FIG. 1, the gear 15 is connected to a gear 16 via a gear mechanism incorporating a conventional buffer mechanism operable when the gear 15 is rotated in one direction.

As shown in FIG. 5, the pin 8b of the cassette box 7 is received in a slot 17a formed through an arm 17 which movable together with the gear 16. The rotation of the gear 16 causes the cassette box 7 to move along the guide grooves 6a, 6b and 6c.

Figure 4:
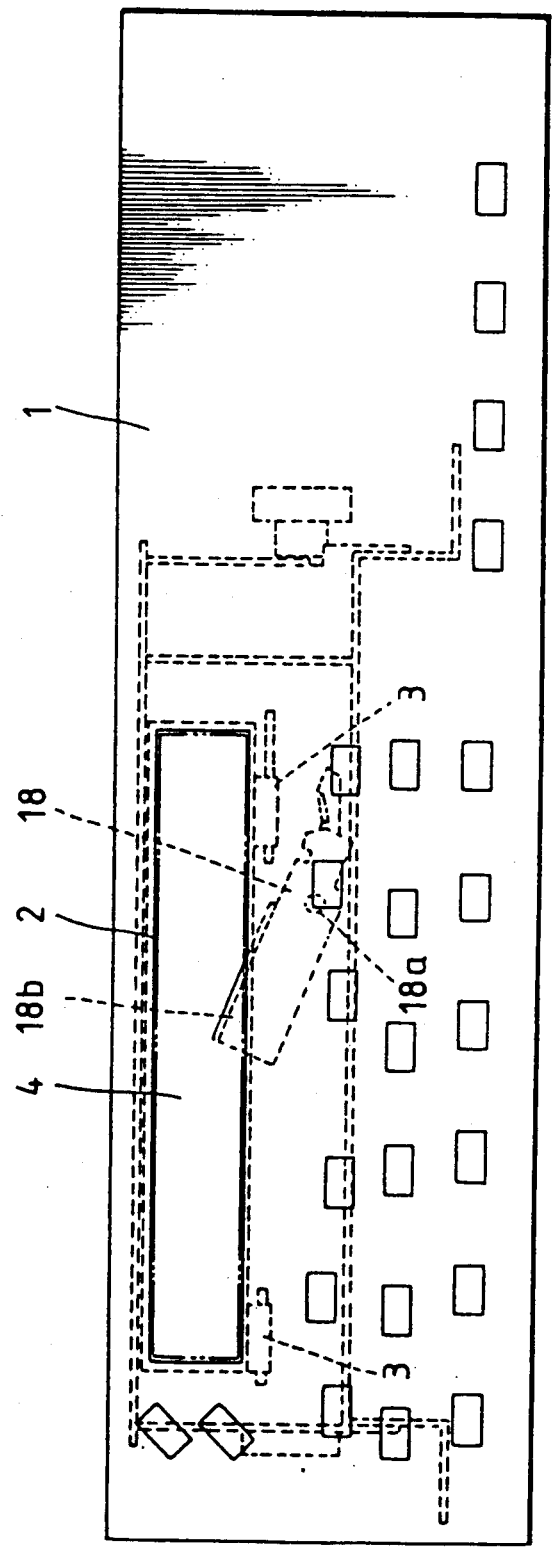
FIG. 4 is a front elevational view.
Figure 7:
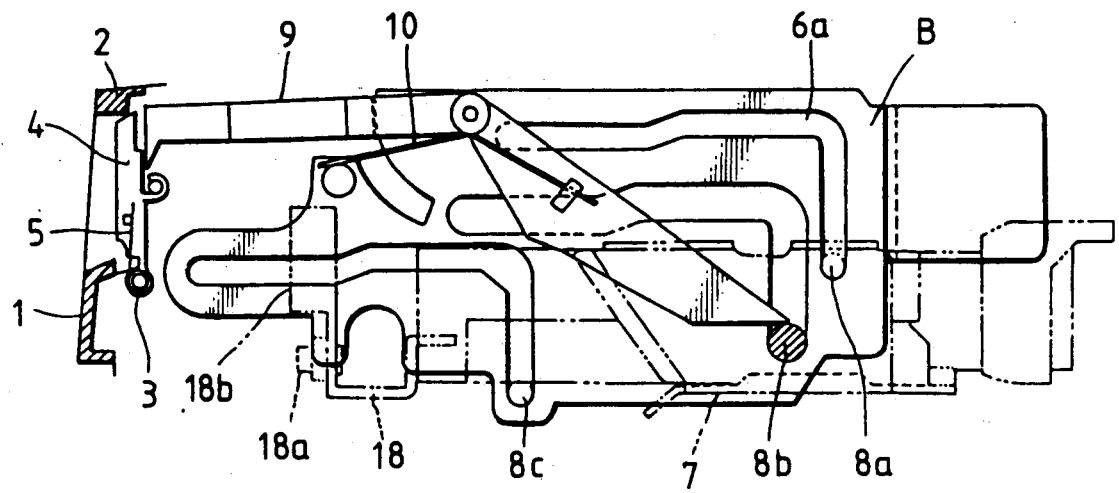
FIG. 7 is a side-elevational view similar to FIG. 6 but showing the condition in which the loading operation is completed and showing the parts positioned in a threading position.
Figure 8:
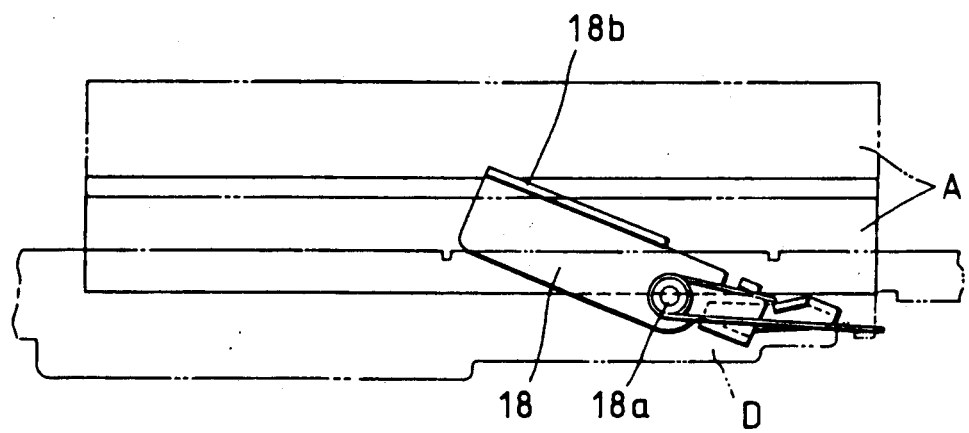
FIG. 8 is a front-elevational view showing a pivotal arm for preventing a double-insertion of cassette tapes.
Figure 9:
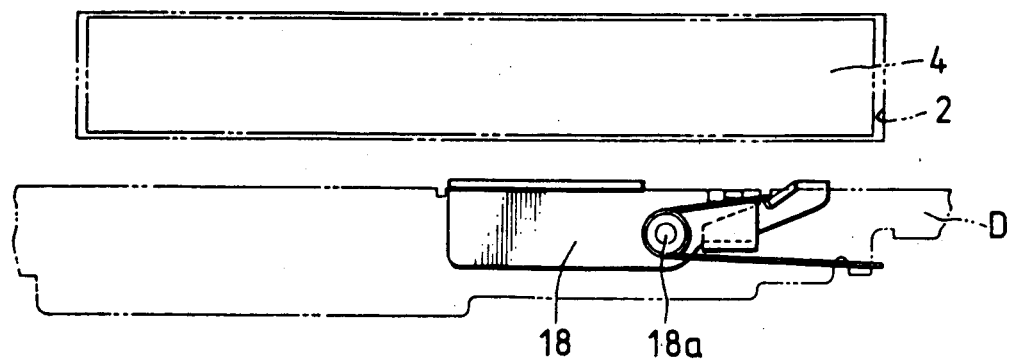
FIG. 9 is a front-elevational view similar to FIG. 8 but showing the pivotal arm in its lowered position.

In FIGS. 4 and 7, a pivotal arm 18 is pressed down at one end by the tape cassette A inserted in the cassette box 7 when the cassette box 7, moving along the vertical portions of the guide grooves 6a, 6b and 6c, comes near the ends thereof.

The pivotal arm 18 is pivotally connected to a frame D by a shaft 18a, and when the pivotal arm 18 is pressed down at the one end by the cassette tape A to be angularly moved, its prevention portion 18b at the other end thereof is moved upwardly on the backside of the insertion hole 2, as shown in FIG. 4.

Figure 3:
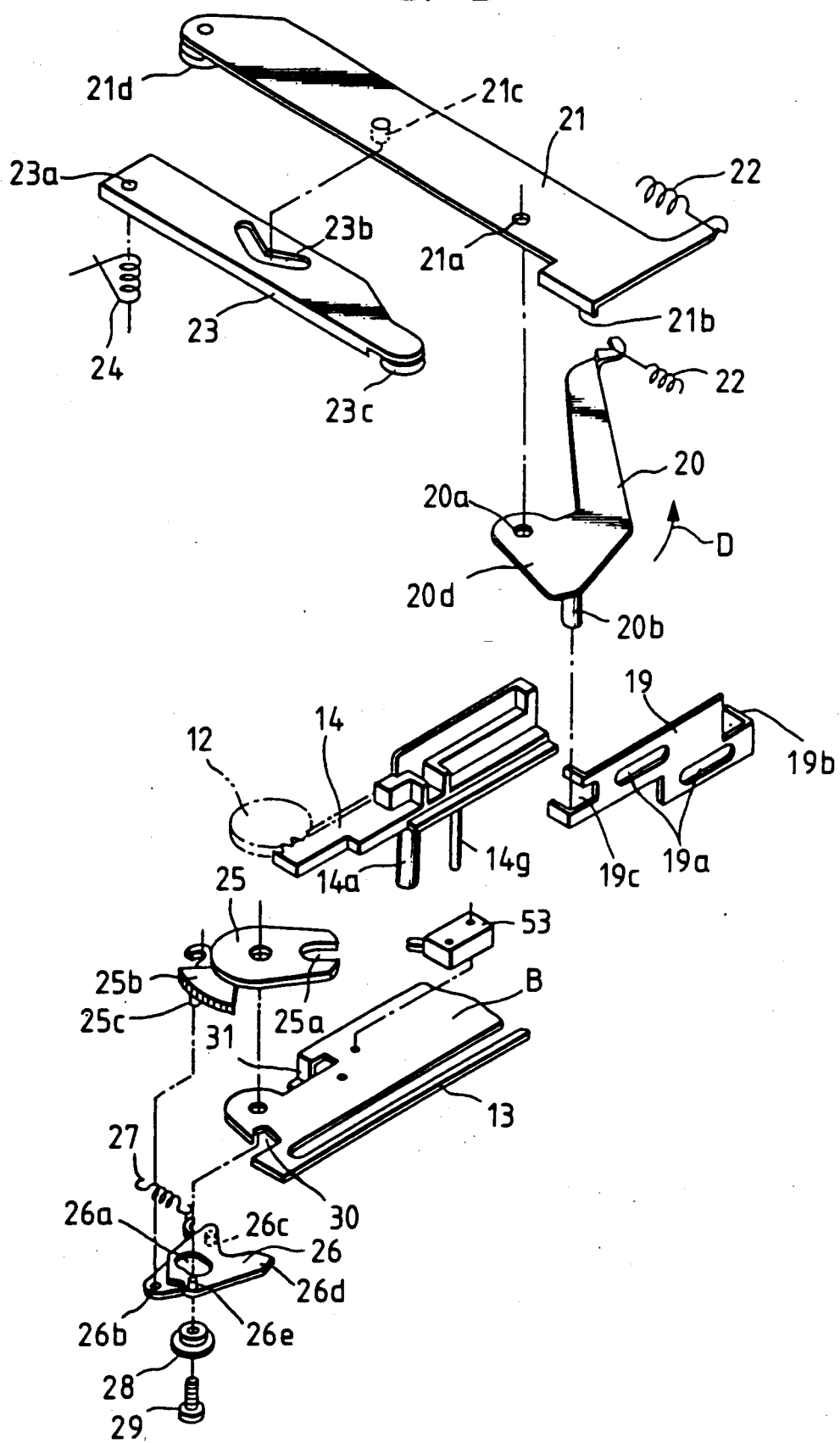
FIG. 3 is a perspective view of an important portion.
Figure 10:
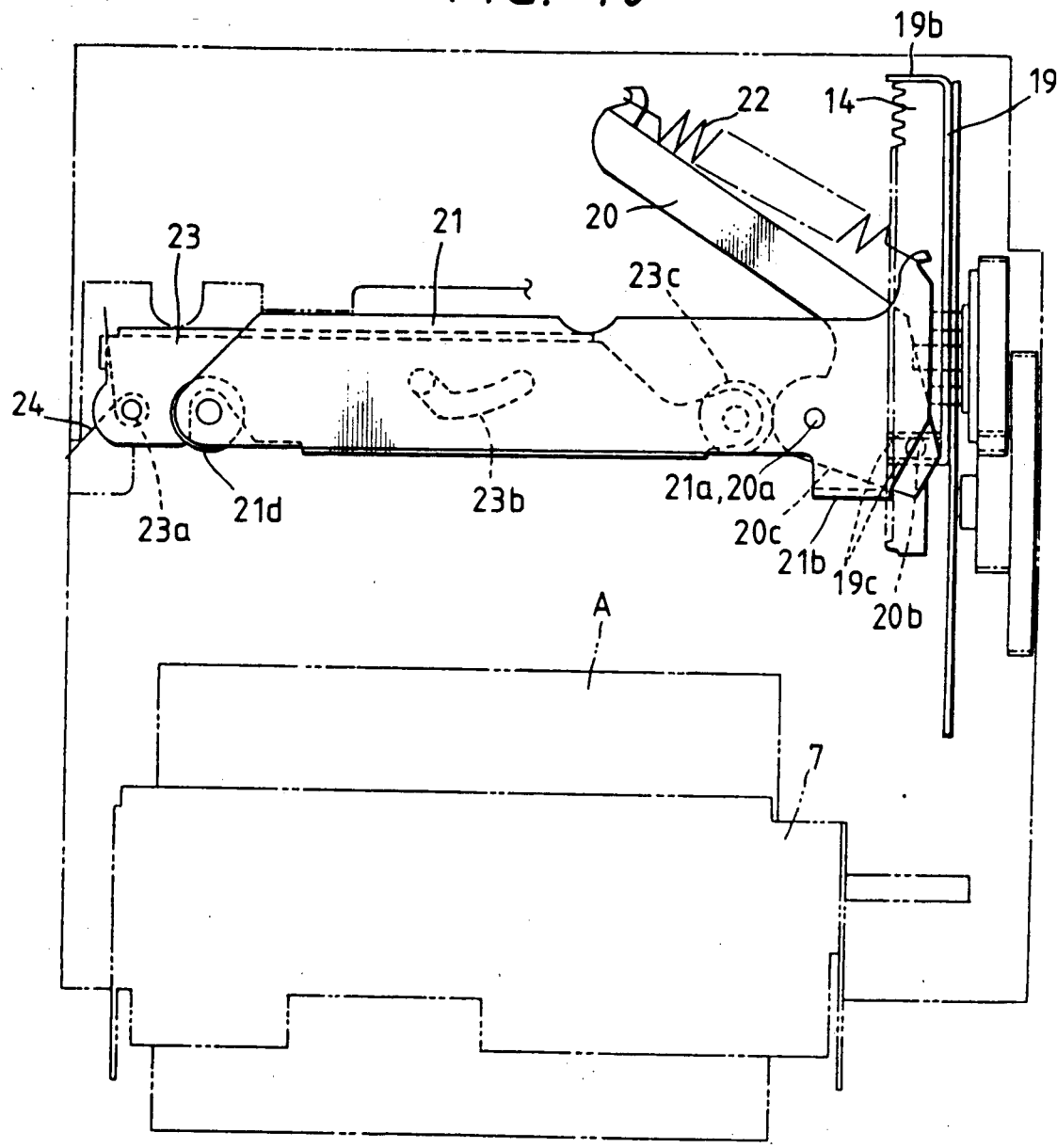
FIG. 10 is a plan view showing a tape cassette push-out mechanism.
Figure 11:
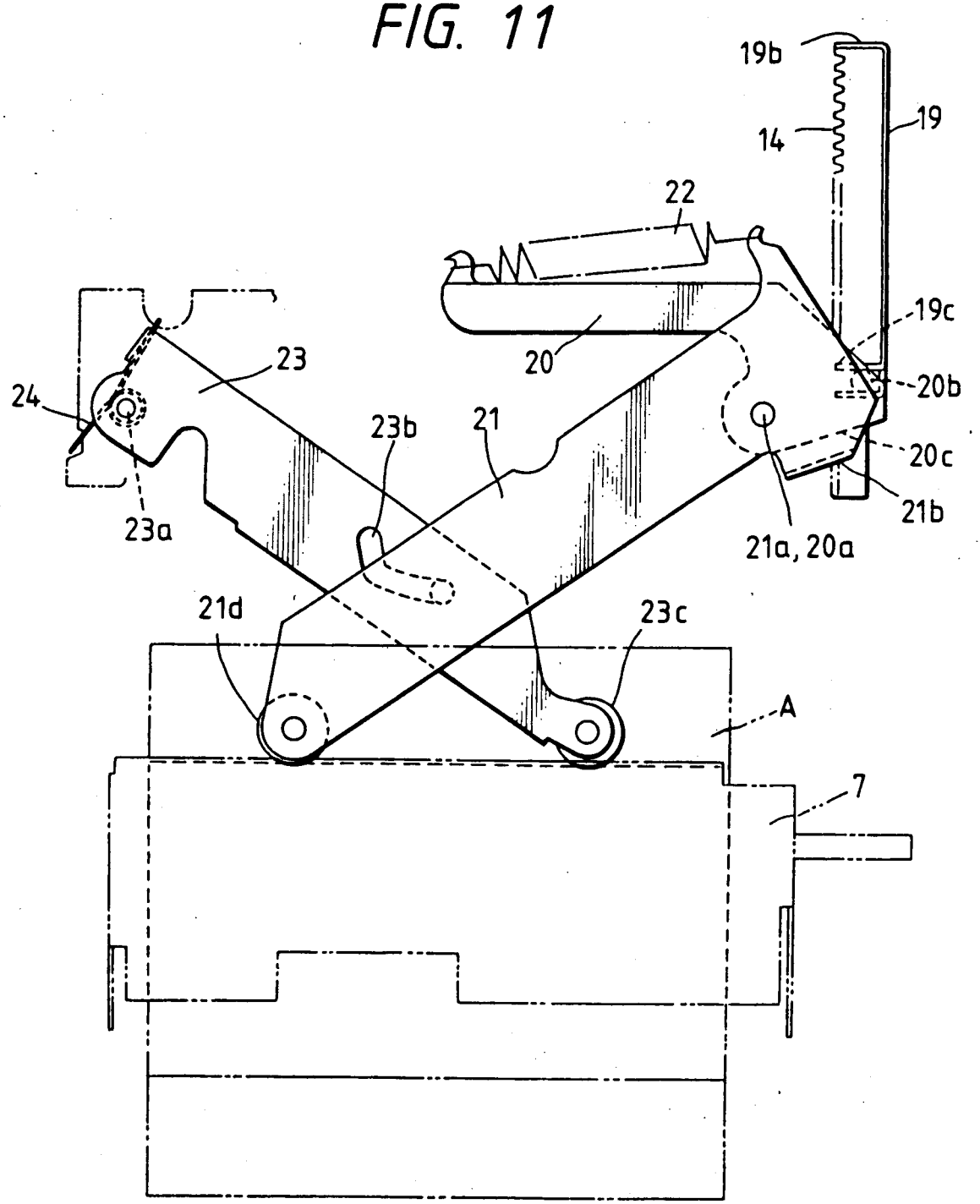
FIG. 11 is a plan view similar to FIG. 10 but showing its operation.
Figure 14:
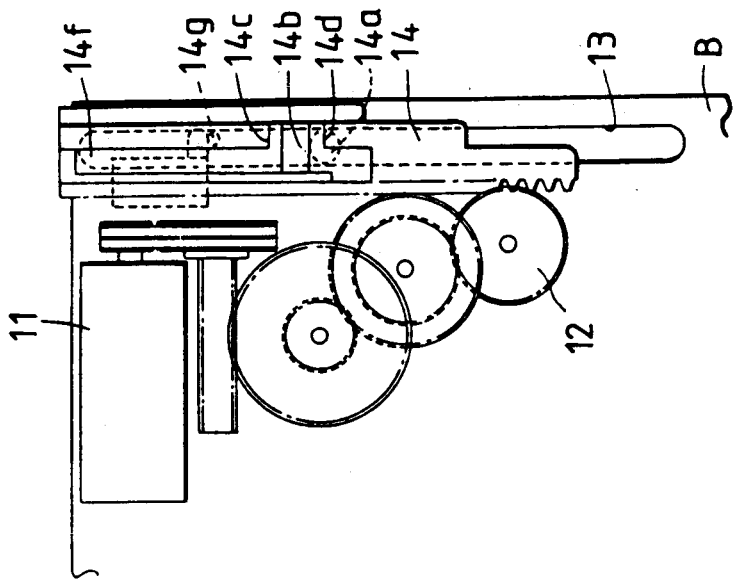
FIG. 14 is a plan view similar to FIG. 13 but showing the condition in which the tape cassette push-out mechanism is being operated.
Figure 13:
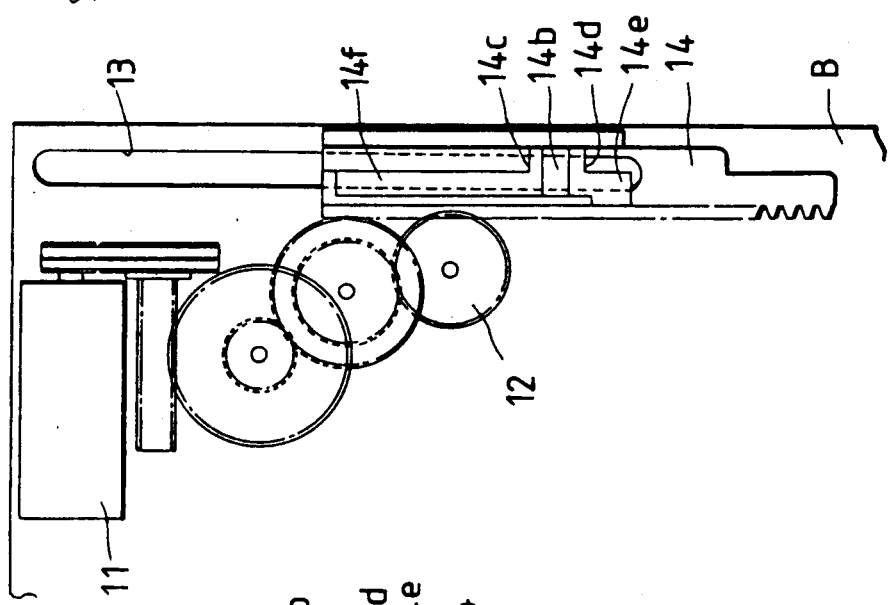
FIG. 13 is a plan view similar to FIG. 12 but showing the condition in which the threading operation is completed.

In FIGS. 3, 10 and 11, a slide member 19 has guide grooves 19a which are guided by the chassis B. The slide member 19 has a bent portion 19b which is urged by the rack 14 when the rack 14 is moved to the end of its stroke (which is shown at the uppermost end of FIG. 10). the slide member 19 also having a holder portion 19c.

A pin 20b of a pivotal arm 20 is received in the holder portion 10c of the slide member 19, the pivotal arm 20 being pivotally mounted on a frame E (FIG. 1) through an aperture ? formed therethrough. When the slide member 19 is urged by the rack 14 to slide, the pivotal arm 20 is also pivotally moved.

An aperture 21a of a first urging arm 21 is in alignment with the aperture 20a of the pivotal arm 20 and is pivotally mounted through the aperture 20a. A spring 22 acts between the pivotal arm 20 and the first urging arm 21.

One side 20c of the pivotal arm 20 is urged against a bent portion 21b of the first urging arm 21 under the influence of the spring 22 to keep a relative position between the pivotal arm 20 and the first urging arm 21.

Therefore, when the pivotal arm 20 is angularly moved in a direction of an arrow D (FIG. 3), the first urging arm 21 is moved together therewith through the spring 22. However, when the angular movement of the first urging arm 21 is prevented, only the pivotal arm 20 is angularly moved, with the spring 22 extended, so that the one side 20c moves away from the bent portion 21b, thus releasing this unisonous movement.

A second urging arm 23 is pivotally mounted on the frame E through an aperture 23a formed through the arm 23. A pin 21c of the first urging arm 21 is received in a generally V-shaped groove 23b formed through the second urging arm 23, and the second urging arm 23 is angularly moved in response to the angular movement of the first urging arm 21.

Urging rollers 21d and 23c are mounted on the ends of the first and second urging arms 21 and 23, respectively, and when the pivotal arm 20 is angularly moved by the rack 14, the rollers 21d and 23c are moved toward the cassette box 7.

A spring 24 serves to return the second urging arm 23, and when the second urging arm 23 is returned by the spring 24, the first urging arm 21 and the pivotal arm 20 are also returned in response to the returning of the second urging arm 23.

In FIGS. 3 and 18 to 20, a threader gear 25 is rotatably mounted on a stepped washer 28 connected to a chassis F by a screw 29, the threader gear 25 having a groove 25a for receiving the pin 14a of the rack 14 and a gear portion 25b of a fan-shape.

A pivotal retainer member 26 has a pivotal slot 26a through which the washer 28 passes, the pivotal retainer member 26 having an aperture 26b in which a pin 25c of the threader gear 25 is received. The pivotal retainer member 26 is pivotal about the pin 25c to an extend allowed by the pivotal slot 26a.

A spring 27 acts between the threader gear 25 and the pivotal retainer member 26 and urges the pivotal slot 26a in one direction relative to the stepped washer 28.

The pivotal retainer member 26 has a pin 26e which is received in a notch 30 in the chassis B when the pivotal retainer member 26 is urged by the spring 27 in the above manner, thereby preventing the pivotal retainer member 26 from angular or pivotal movement, so that the threader gear 25 is also prevented by the pin 25c from angular movement.

The pivotal retainer member 26 has a projecting portion 26d extending to the guide groove 13, and when the projecting portion 26d is urged by the pin 14a, the pivotal retainer member 26 is pivotally moved against the bias of the spring 27 in such a manner than the pivotal slot 26a is moved in the opposite direction relative to the stepped washer 28.

As a result, the pin 26e is disengaged from the notch 30, so that the pivotal retainer member 26 can be pivotally moved, which also enables the pivotal movement of the threader gear 25.

The pivotal retainer member 26 also has a pin 26c, and when the pin 26e of the pivotal retainer member 26 is engaged in the notch 30 under the influence of the spring 27, the pin 26c is held against a retaining portion 31 of the chassis F to thereby limit the direction of rotation of the pivotal retainer member 26.

Figure 2:
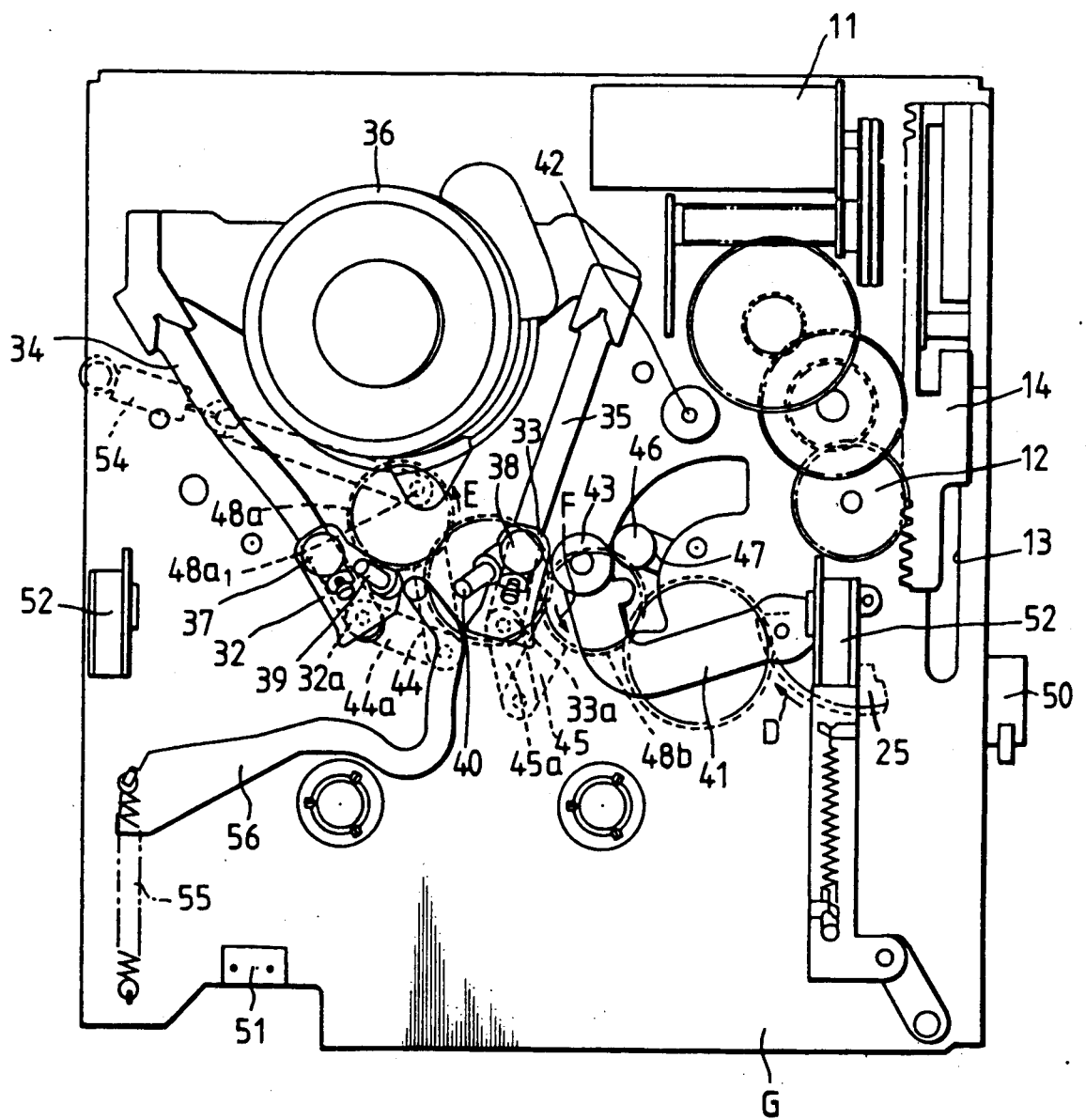
FIG. 2 is a plan view with a cassette box and urging arms omitted from FIG. 1.

In FIG. 2, slide blocks 32 and 33 are slidable along guide grooves 34 and 35, respectively, which are formed through a chassis G. The slide blocks 32 and 33 have on their lower surface respective pins 32a and 33a which are received in the guide grooves 34 and 35, respectively. The slide blocks 32 and 33 have on their upper surfaces respective guide rollers 37 and 38 for drawing the tape from the tape cassette A and winding it on a cylinder head 36. The slide blocks 32 and 33 also have on their upper surfaces respective guide pins 39 and 40 for extending the tape obliquely relative to the cylinder head 36.

The lengths of the guide grooves 34 and 35 are so determined that when the slide blocks 32 and 33 are disposed in their initial positions before drawing the tape from the tape cassette A, the pin 33a of the slide block 33 is abutted against the end of the guide groove 35 while the pin 32a of the slide block 32 is not abutted against the end of the guide groove 34. This arrangement is intended to positively abut the slide block 33 relative to the guide groove 35 and to prevent the slide block 32 from abutting against the guide groove 34 due to dimensional irregularities.

A pinch roller 43 is mounted on an arm 41 and cooperates with a capstan 42 to hold the tape therebetween so as to drive the tape.

A series of gears 48 are drivingly connected to the gear portion 25b of the threader gear 25, and an arm 44 is fixedly connected to one gear 48a of these gears. The arm 44 and the slide block 32 are connected together by a link 44a.

An arm 45 is fixedly connected to another gear 48b of the gears 48, and the arm 45 and the slide block 33 are connected together by a link 45a.

Therefore, when the threader gear 25 rotates in the direction of the arrow D, the series of gears 48 are rotated together with the arms 44 and 45, so that the arms 44 and 45 urge the respective links 44a and 45a. As a result, the slide blocks 32 and 33 are moved along the respective guide grooves 34 and 35 to draw the tape from the tape cassette A to wind the same on the cylinder head 36.

The gear 48a has a pin 48al, and a spring 54 extends between the pin 48al and the chassis G in such a manner that the spring 54 passes by a dead point during the sliding movement of the slide block.

Figure 21:
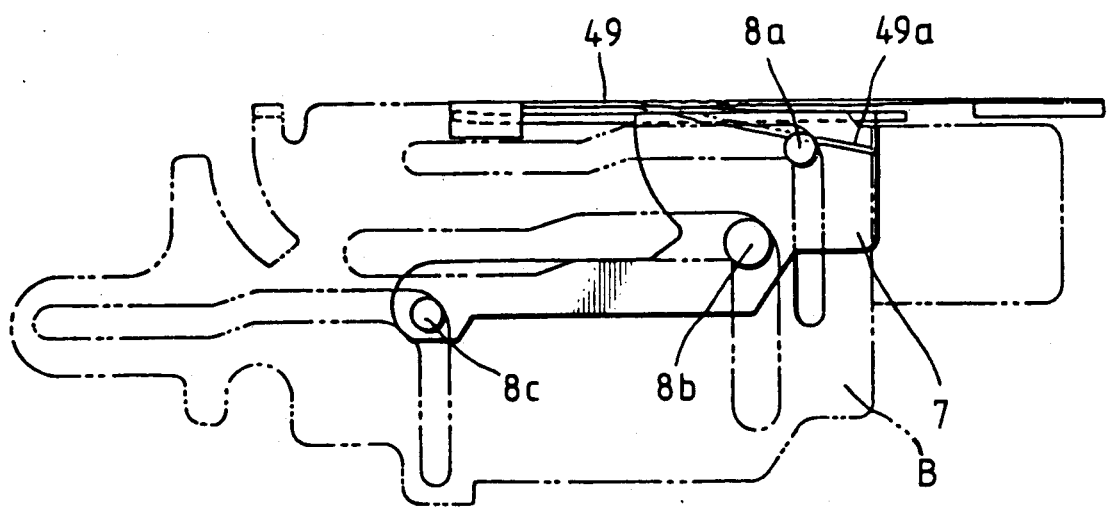
FIG. 21 is a side-elevational view showing the operation of a spring plate.
Figure 22:
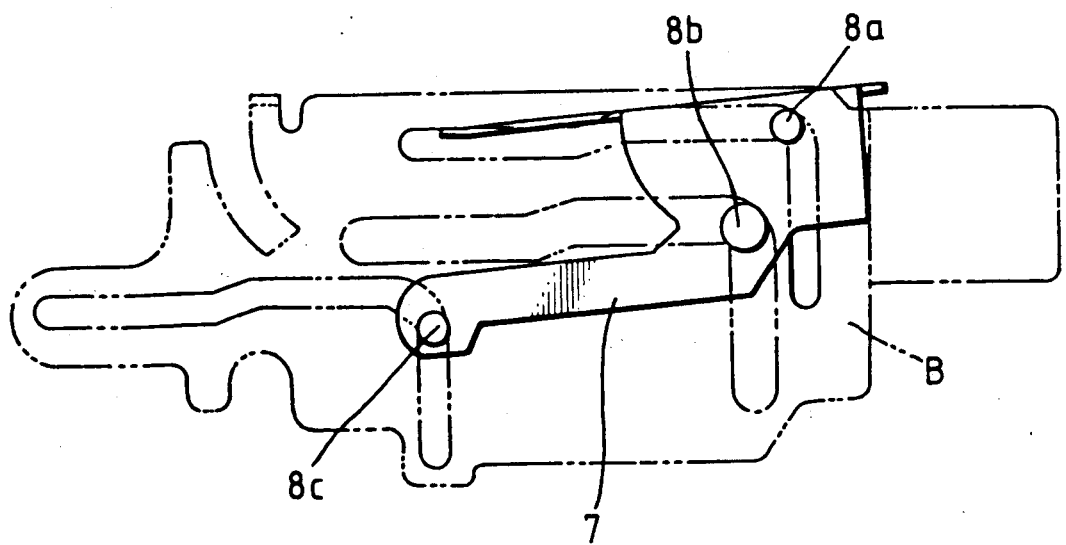
FIG. 22 is a side-elevational view showing the condition in which the cassette box is unable to operate because of lack of the spring plate.

In FIGS. 21 and 22, a spring plate 49 has a depressive portion 49a which presses down the rear end of the cassette box 7 when the pins 8a, 8b and 8c of the cassette box 7 reach the corners of the guide grooves 6a, 6b and 6c, respectively.

The operation of the above digital audio tape recorder will now be described.

As shown in FIG. 5, the guide pins 8a, 8b and 8c of the cassette box 7 in the respective guide grooves 6a, 6b and 6c are disposed in their standby positions close to the door 4.

In this condition, the tape cassette A is pushed into the cassette box 7 through the insertion opening 2 of the front panel 1, with the door 4 opened into a flat condition.

At this time, due to this pushing operation, the gear 16 is slightly angularly moved, operating the buffer mechanism incorporated in the gear train from the gear 15 to the gear 16, but the gear 15 does not move angularly.

When the gear 16 is thus slightly moved angularly, a switch 50 (FIG. 2) is turned on.

Figure 12:
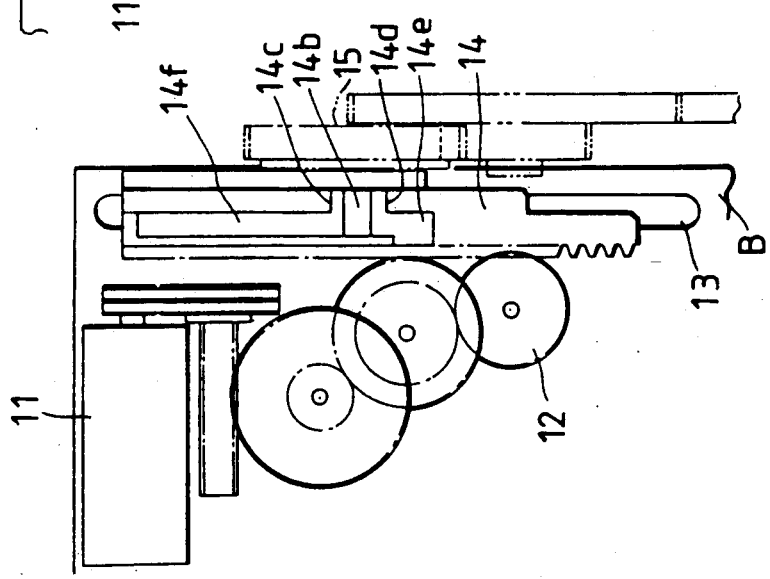
FIG. 12 is a plan view showing a rack mechanism in an inoperative condition.

When the switch 50 is turned on, the motor 11 is rotated to drive the gear 12, so that the rack 14 slides downwardly (FIG. 12).

Figure 15:
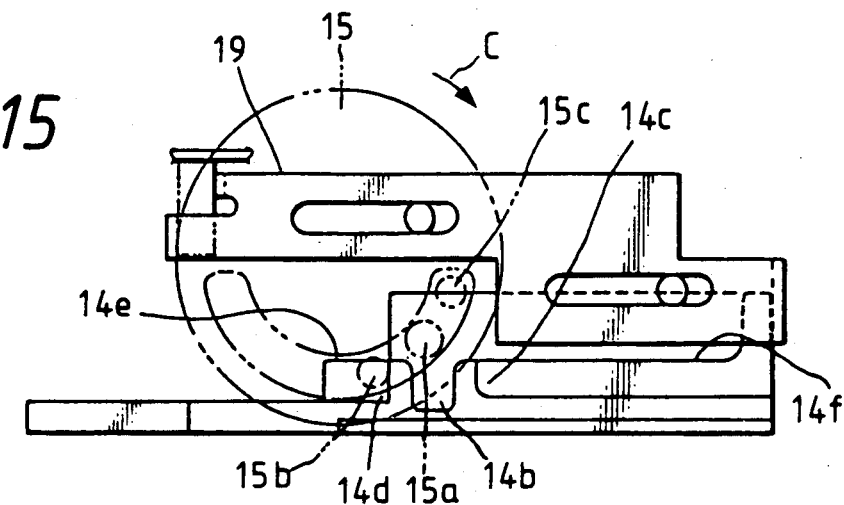
FIG. 15 is a side-elevational view of FIG. 12.
Figure 16:
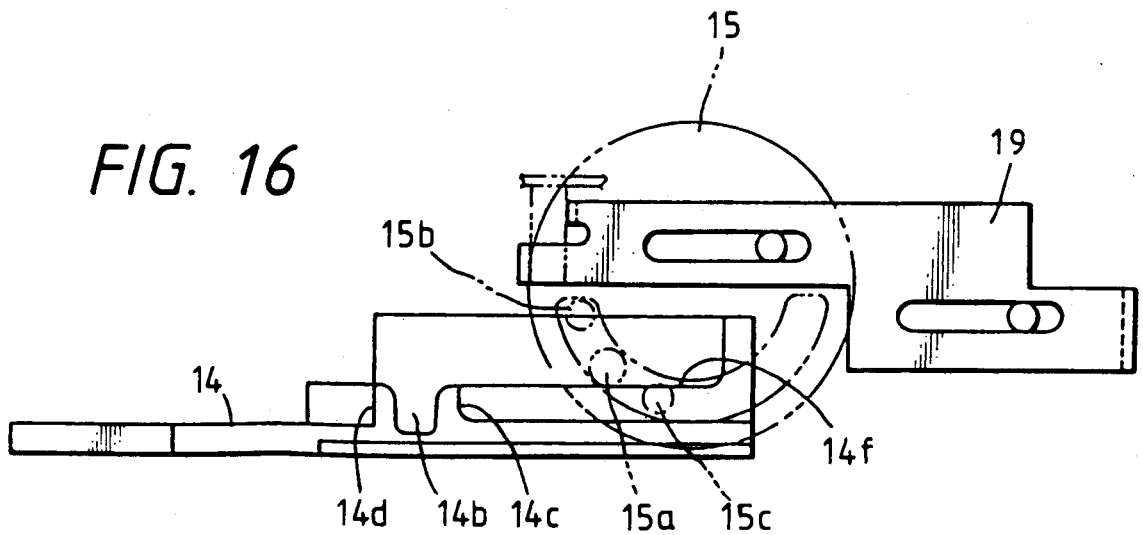
FIG. 16 is a side-elevational view of FIG. 13.

The relative position between the rack 14 and the gear 15 at the time of effecting the starting operation is that shown in FIGS. 12 and 15.

Then, the rack 14 slides in a left-hand direction (FIG. 15), so that the urging wall 14d urges the short pin 15b of the gear 15 to rotate the gear 15.

As a result of the rotation of the gear 15, the long pin 15a is engaged in the engaging groove 14b, and the gear 15 continues to rotate through this engagement, but finally the long pin 15a is disengaged from the engaging grooves 14b after the gear 15 rotates through a certain angle.

At this time, however, since the long pin 15a is brought into contact with the rotation-preventing surface 14f to prevent the rotation of the gear 15, the angle of rotation of the gear 15 is kept at a predetermined angle, thereby holding the gear 15 from displacing relative to this angular position.

The rotation of the gear 15 causes the gear 16 to rotate, and the arm 17, moving together with the gear 16, causes the pin 8b to move from the position shown in FIG. 5 to the position shown in FIG. 7. As a result, the cassette box 7 is moved from the position of insertion of the tape cassette A to a threading position where the tape is drawn from the tape cassette A.

During this time, the cassette box 7 is moved upwardly to a position or level higher than the position of insertion of the tape cassette A since the guide grooves 6a, 6b and 6c have the respective stepped portions 6a1, 6b1 and 6c1. This higher position and the threading position can be preselected for setting the tape cassette A.

Thus, the insertion opening 2 can be at a level lower than this higher position, and therefore if the height or level of the tape recorder for an automobile or the like is limited, a reasonable upper margin of the front panel 1 above the insertion opening 2 can be secured for the sake of the appearance.

The pin 8b contacts the cam surface 9a during its horizontal movement to angularly move the arm 9 against the bias of the spring 10, as shown in FIG. 6.

The angular movement of the arm 9 causes the hook portion 9b to urge the pin 4a of the door 4 in its opening direction. Upon further movement of the pin 8b, the pin 8b is disengaged from the cam surface 9a, so that the door 4 is returned to its closed position under the influence of the spring 10 to thereby prevent dust and the like from intruding through the door 4.

The arm 9 for opening and closing the door 4 is necessary because if the door 4 is kept closed, the ejection of the tape cassette A cannot be effected.

If the front end portion of the cassette box 7 close to the door 4 is inclined downwardly due to vibration or the like as shown in FIG. 22 when the cassette box 7 reaches the corners of the guide grooves 6a, 6b and 6c during the loading operation, the pin 8c cannot move in a horizontal direction, and the pin 8a cannot move vertically.

Therefore, the cassette box 7 cannot be moved further.

However, the depressive portion 49a of the spring plate 49 presses down the rear portion of the cassette box 7 to hold the cassette box 7 horizontally when the cassette box 7 reaches the corners of the guide grooves. Therefore, the above situation where the cassette box 7 is prevented from moving further is not encountered.

Thus, the cassette box 7 is moved vertically downwardly to open the lid and to effect other operations, so that the cassette box 7 is set in the threading position.

The tape cassette A, when set in the threading position, presses a switch 51 to turn it on.

Also, when the tape cassette A is set in the threading position, two tape end sensors 52 (FIG. 2) for detecting the ends of the tape in the cassette case A initiate their operations.

However, even if a foreign object is inserted through the insertion opening 2 and presses the cassette box 7, or if the cassette A is inserted backwards to press the cassette box 7, the above loading operation is effected, so that the cassette box 7 is moved to the threading position.

In the event of the insertion of a foreign object or the reverse loading of a cassette case, the pressing of the switch 51 or the operation of the tape end sensors 52 is not effected properly.

If either of the above two situations occurs at the threading position, the motor 11 immediately rotates in a reverse direction to effect an ejection of the cassette box 7 which is a reverse operation of the loading operation.

When the tape cassette A is set in the threading position, the one end of the pivotal arm 18 is depressed by the tape cassette A, so that the pivotal arm 18 is angularly moved, with its prevention portion 18b raised and disposed on the backside of door 4, thereby preventing the insertion of another tape cassette A.

The prevention portion 18b may be so arranged as to be raised and disposed immediately adjacent to the backside of the door 4 so as to prevent the door 4 from being opened.

The rotation of the gear 15 is stopped, and the long pin 15a is prevented by the rotation-preventing surface 14f from angular movement. Simultaneously with this, the setting of the tape cassette A at the threading position is completed, but the rack 14 continues to move, and its pin 14a pushes the projecting portion 26d of the pivotal retainer member 26.

When the projecting portion 26d is thus pushed, the pivotal retainer member 26 is angularly moved about the aperture 26b, so that the pin 26e is disengaged from the notch 30 to thereby allow the rotation of the pivotal retainer member 26.

Therefore, the threader gear 25 is also allowed to rotate, and the pin 14a is received in the groove 25a of the threader gear 25 as a result of the above rotation of the pivotal retainer member 26.

Then, the pin 14a urges the threader gear 25 and the pivotal retainer member 26 to rotate in accordance with the movement of the rack 14, and this rotation is transmitted through the fan-shaped gear portion 25b to the series of gears 48.

When the pivotal retainer member 26 is thus rotated, the pin 26c is disengaged from the retaining portion 31. At this time, the pin 26c operates a switch 53, thereby detecting the arrival of the cassette box 7 at the threading position and also the initiation of the threading.

Upon rotation of the series of gears 48, the arms 44 and 45 rotate to urge the links 44a and 45a, respectively, to move the slide blocks 32 and 33. As a result, the guide rollers 37 and 38 of the slide blocks 32 and 33 draw the tape from the tape cassette A, and the guide pins 39 and 40 wind the tape on the cylinder head 36.

At this time, the spring 54 passes by the dead point as a result of the rotation of the gear 48a, and therefore again produces an urging force to pull the pin 48a1, so that the spring 54 holds the slide block 32 against the movement and also holds the slide block 33 against movement through the gear 48b.

In response to this movement, the arm 41 also moves angularly to bring the pinch roller 43 into contact with the capstan 42 so as to drive the tape for running, thereby completing the threading operation.

The operation from the completion of the threading to the ejecting will now be described.

In accordance with an external ejecting instruction, the motor 11 begins to rotate in a reverse direction, so that the rack 14 also begins to return in a reverse direction.

As a result, the threader gear 25 and the pivotal retainer member 26 are rotated in their reverse directions, so that the slide blocks 32 and 33 and the pinch roller 43 are returned to their initial positions through the series of gears 48, and the tape wound on the cylinder head 36 is again wound on the tape cassette A.

The spring 54 again passes by the dead point as a result of the rotation of the gear 48a and pulls the pin 48a1 to urge the gear 48a in a direction of an arrow E.

This urging or biasing force is transmitted to the slide block 32 through the arm 44 and the link 44a to urge the slide block 32 toward the rear end of the guide groove 34. At this time, however, the pin 32a is not abutted against the rear end of the guide groove 34.

Therefore, the slide block 32 may rattle slightly, but it is held in place without rattling since a tension arm 56 biased by a spring 55 is held against the slide block 32.

The urging force to urge the gear 48a in the direction of the arrow E also urges the gear 48b in a direction of an arrow F.

Therefore, this urging force is transmitted to the slide block 33 through the arm 45 and the link 45a, so that the pin 33a of the slide block 33 is abutted against the rear end of the guide groove 35 as shown in FIG. 2. Therefore, the slide block 33 is held at its rear position without rattling.

Hence, the next time the tape cassette A arrives at the threading position, the guide rollers 37 and 38 and the guide pins 39 and 40 are positioned on the backside of the tape. Thus, they do not interfere with the tape and do not bend or damage it.

Further, the spring 54 urges the threader gear 25 in a direction opposite to the direction of the arrow D, so that the pin 26c of the pivotal retainer member 26 is pressed against the retaining portion 31 of the chassis F to thereby maintain the pivotal retainer member 26 and the threader gear 25 at their initial positions.

When the pin 14a is disengaged from the groove 25a of the threader gear 25 as a result of the rotation of the threader gear 25 in its reverse direction as described above, the pivotal retainer member 26 is angularly moved under the influence of the spring 27, and the pin 26e is engaged in the notch 30 to prevent the pivotal retainer member 26 and the threader gear 26 from rotating.

At the same time, since the pin 26c is urged against the retaining portion 31, the pivotal retainer member 26 is held in position against movement, so that the switch 53 can be turned on in a stable manner.

Figure 17:
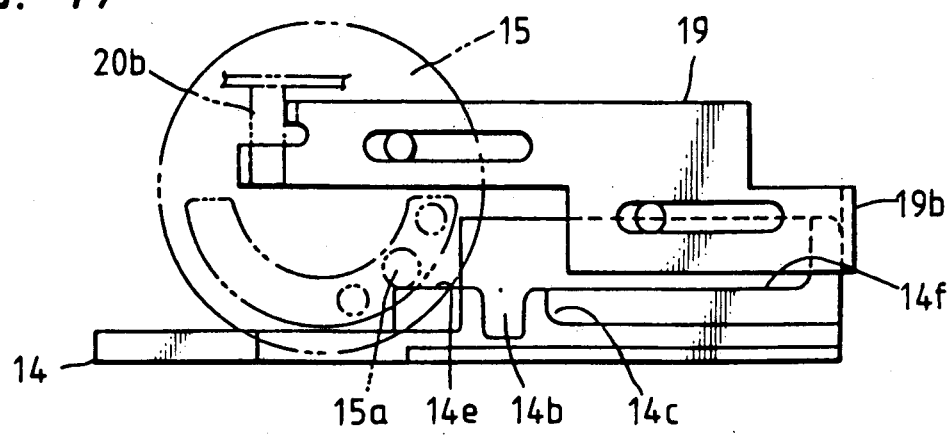
FIG. 17 is a side-elevational view of FIG. 14.

Then, the urging wall 14c of the rack 14 urges the short pin 15c to rotate the gear 15, so that the long pin 15a is engaged in the engaging groove 14b to continue the rotation of the gear 15. Finally, the long pin 15a is disengaged from the engaging groove 14b as shown in FIG. 17 to thereby stop the rotation of the gear 15.

During the above operation, the cassette box 7 is moved in a manner reverse to the loading operation because of the reverse rotation of the gear 16, so that the cassette box 7 reaches the position where it disposed adjacent to the backside of the insertion opening 2, with the tape cassette A placed on the door 4.

Thereafter, the rack 14 continues to retract, and the long pin 15a is brought into engagement with the rotation-preventing surface 14e to prevent a further rotation of the gear 15.

Because of the retraction of the rack 14, the bent portion 19b of the slide member 19 is urged by the rack 14 to slide rearwardly.

When the slide member 19 is thus moved rearwardly, the pin 20b is urged by the holder portion 19c of the slide member 19, so that the pivotal arm 20 is angularly moved. As a result, the first urging arm 21 is angularly moved through the spring 22 to displace its urging roller 21d forwardly.

At the same time, the first urging arm 21 angularly moves the second urging arm 23 to displace the urging roller 23c forwardly, so that the urging rollers 21d and 23c push the tape cassette received in the cassette box 7, thereby enabling the removal of the tape cassette (FIG. 11).

When the above operation caused by the retraction of the rack 14 is completed, the pin 14g of the rack 14 pushes a switch 54 (FIG. 1) to again rotate the motor 11 in its normal direction, and the motor 11 is stopped when the first and second urging arms 21 and 23 are returned to their positions shown in FIG. 1.

If the urging rollers 21d and 23c cannot be displaced, the first and second urging arms 21 and 23 are not angularly moved, with the spring 22 extended, even when the pivotal arm 20 is angularly moved, thereby positively preventing damage and malfunction of the parts.

As described above, in the present invention, one of the pair of slide blocks for effecting the threading operation is abutted against one of the guide grooves by the urging means, and the tension arm is abutted against the other slide block. Therefore, the two slide blocks, kept in their initial positions before the tape drawing operation, do not rattle relative to the chassis, and even if vibration develops, noises such as vibratory sound will not occur. Further, since the slide blocks are positively held at their initial positions, the slide blocks are not displaced. Therefore, the guide rollers do not overlap the tape position, which would otherwise bend the tape and give rise to other damage and would cause a malfunction such as the inability of setting the tape.

What is claimed is:

1. A threading device for a tape recorder comprising:
    a cylinder head rotatably mounted on a chassis;
    a pair of guide grooves formed in said chassis and extending toward said cylinder head, each of said guide grooves having a front end which is proximate to said cylinder head on a rear end which is remote with respect to said cylinder head;
    slide blocks for drawing a tape of a tape cassette and winding said tape on said cylinder head, said slide blocks having at lower surfaces respective pins guided respectively by said guide grooves and having at upper surfaces respective guide rollers which contact the tape;
    a series of gears rotated by a drive source so as to move said slide blocks reciprocally along said guide grooves, respectively;
    biasing means extending between said gears and said chassis for biasing said slide blocks toward an initial tape-drawing position, said pin of one of said slide blocks being abutted against the rear end of one of said guide grooves under the bias of said biasing means in said initial tape-drawing position so as not to rattle, whereas the other slide block is not abutted against the rear end of the other of said guide grooves in said initial tape-drawing position; and
    a tension arm for imparting tension to the tape which has been drawn by said slide blocks from said tape cassette and wound on said cylinder head, said tension arm being abutted against the other slide block in said initial tape-drawing position, thereby preventing a rattling of the other slide block in said initial tape-drawing position;
    further comprising:
    a linearly movable member arranged so as to be moved by said drive source and having a pin slidably received in a groove formed in said chassis;
    a rotatable member, connected to said chassis and said series of gears, engageable with said pin of said linearly movable member to be rotated to move said slide blocks which draw the tape from the tape cassette;
    a pivotal retainer member connected to said rotatable member and having a retaining portion which is engageable with a notch in said chassis to prevent the rotation of said rotatable member; and
    projecting portion formed on said pivotal retainer member and being engageable with said pin of said linearly movable member before said rotatable member comes into contact with said pin of said linearly movable member, said pivotal retainer member thereby pivoting so as to disengage said retaining portion from said notch in said chassis to enable the rotation of said pivotal retainer member and said rotatable member.

2. A threading device for a tape recorder according to claim 1, wherein said drive source is a motor.

3. A threading device for a tape recorder according to claim 1, wherein said biasing means is a spring connected at one end to a pin disposed on a gear of said series of gears and connected at the other end to said chassis.

4. A threading device for a tape recorder according to claim 1, wherein said tension arm is biased counterclockwise by a spring.

* * * * *